(12) United States Patent
Mauritz

(10) Patent No.: US 9,882,619 B2
(45) Date of Patent: Jan. 30, 2018

(54) DETERMINING HOW TO COMBINE RECEIVED SIGNALS

(71) Applicant: TELEFONAKTIEBOLAGET LM ERICSSON (PUBL), Stockholm (SE)

(72) Inventor: Oskar Mauritz, Johanneshov (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 9 days.

(21) Appl. No.: 15/106,951

(22) PCT Filed: Dec. 23, 2013

(86) PCT No.: PCT/EP2013/077878
§ 371 (c)(1),
(2) Date: Jun. 21, 2016

(87) PCT Pub. No.: WO2015/096846
PCT Pub. Date: Jul. 2, 2015

(65) Prior Publication Data
US 2017/0033849 A1 Feb. 2, 2017

(51) Int. Cl.
*H04B 7/04* (2017.01)
*H04B 7/0491* (2017.01)
(Continued)

(52) U.S. Cl.
CPC ........... *H04B 7/0491* (2013.01); *H04B 7/024* (2013.01); *H04B 7/0857* (2013.01); *H04B 7/0871* (2013.01)

(58) Field of Classification Search
CPC .... H04B 7/0491; H04B 7/0857; H04B 7/024; H04B 7/0871; H04B 7/10
(Continued)

(56) References Cited

U.S. PATENT DOCUMENTS

| 6,128,355 A | 10/2000 | Backman et al. |
| 2010/0330946 A1 | 12/2010 | Akkarakaran et al. |
| 2014/0242934 A1* | 8/2014 | Guo .................... H04B 7/0857 455/273 |

FOREIGN PATENT DOCUMENTS

WO    2011071426 A1    6/2011

OTHER PUBLICATIONS

3rd Generation Partnership Project (3GPP), "Performance considerations for unitary versus non-unitary precoding," 3GPP TSG RAN WG1 Meeting #47, R1-063245, Nov. 6-10, 2006, Riga, Latvia.
(Continued)

*Primary Examiner* — Kevin M Burd
(74) *Attorney, Agent, or Firm* — Patent Portfolio Builders PLLC

(57) ABSTRACT

It is presented a method for determining how to combine received signals from a plurality of antennas in an antenna set. The method is performed in a network node and comprises the steps of: determining for each evaluation sector whether it is better to perform intra-sector IRC on received signals for all antennas of the evaluation sector than refraining from performing IRC; for each evaluation sector, when it is better to perform intra-sector IRC, forming a single antenna part; for each evaluation sector, when it is better to refrain from performing IRC on any of the received signals for the antennas, forming a separate antenna part for each antenna; determining for a sector group whether it is better to perform inter-sector IRC on all its antennas or to keep the previously formed antenna parts; forming a single combined antenna part for the sector group when it is better to perform IRC on the at least two evaluation sectors of the sector group.

15 Claims, 6 Drawing Sheets

(51) Int. Cl.
*H04B 7/024* (2017.01)
*H04B 7/08* (2006.01)

(58) Field of Classification Search
USPC .......................................................... 375/267
See application file for complete search history.

(56) References Cited

OTHER PUBLICATIONS

International Search Report and Written Opinion dated Sep. 15, 2014 in related International Application No. PCT/EP2013/077878.
Larsson, "Model-Averaged Interference Rejection Combining," IEEE Transactions on Communications, Feb. 2007, vol. 55, No. 2.
Stoica et al., "Model-Order Selection: A review of information criterion rules," IEEE Signal Processing Magazine, Jul. 2004, vol. 21, No. 4.

* cited by examiner

DETERMINING HOW TO COMBINE RECEIVED SIGNALS

TECHNICAL FIELD

The invention relates to a method, network node, computer program and computer program product for determining how to combine received signals.

BACKGROUND

Mobile communication networks typically comprise many network nodes, e.g. radio base stations, that are used to provide coverage to wireless devices, also known as instances of user equipment (UEs). However, the wireless devices experience interference from neighbouring network nodes, particularly in border areas between cells. Such interference limits the link quality for the wireless devices, resulting in limited spectral efficiency and throughput.

Coordinated multi-point reception (CoMP) is one way to attempt to increase uplink throughput by increasing the received signal power and by suppressing interference.

Moreover, radio base stations are often equipped with several receive antennas. The radio signal from a wireless device can be received by combining signals from these several antennas to increase the received signal power and receive diversity. Combining signals from several antennas also makes it possible to suppress interference by Interference Rejection Combining (IRC).

Although IRC is optimum when the propagation channel and noise plus interference covariance matrix are known in the receiver, estimation errors of the channel and of the noise plus interference covariance matrix may degrade the performance of IRC so that its performance is worse than that of maximum ratio combining (MRC).

IRC between antennas in a single sector is in the following referred to as intra-sector IRC. IRC between antennas in more than one sector is denoted inter-sector IRC.

In many deployments, antenna signals used for combining are located in the same sector, also referred to as single-point reception. In order to further increase the received signal power and to further suppress interference, antenna signals from different sectors several reception points may be combined, known as multi-point reception. Antenna signals may also be sent from one base station to another to be used for combining in the latter base station. Multi-point reception is also known as macro diversity, in Universal Terrestrial Radio Access more specifically as soft handover or softer handover.

IRC and MRC are candidates for combining both in single-point reception and multi-point reception.

U.S. Pat. No. 6,128,355 presents a method and system for combining signals in a receiver employing antenna diversity. If the interference exceeds a predetermined threshold, interference rejection combining (IRC) is used. If the interference does not exceed the predetermined threshold, maximum ratio combining (MRC) is used.

However, in multi-point reception the interference level may be different in different sectors. Furthermore, the interference may either be correlated or uncorrelated between sectors. IRC and MRC provide too few alternatives to successfully adapt to different interference scenarios for multi-point reception.

SUMMARY

It is an object to improve how a plurality of antennas can be combined for received signals.

According to a first aspect, it is presented a method for determining how to combine received signals from a plurality of antennas in an antenna set, wherein each antenna belongs to one of a plurality of evaluation sectors. The method is performed in a network node of a cellular communication network and comprises the steps of: determining for each evaluation sector whether it is better to perform intra-sector IRC, interference rejection combining, on received signals for all antennas of the evaluation sector than refraining from performing IRC on any of the received signals for the antennas of the evaluation sector; for each evaluation sector, when it is better to perform intra-sector IRC, forming a single antenna part for the evaluation sector comprising all antennas of the evaluation sector; for each evaluation sector, when it is better to refrain from performing IRC on any of the received signals for the antennas, forming a separate antenna part for each antenna of the evaluation sector; determining for a sector group comprising at least two evaluation sectors whether it is better to perform inter-sector IRC on all antennas of the at least two evaluation sectors or to keep the previously formed antenna parts; forming a single combined antenna part for the sector group comprising all antennas of the evaluation sectors of the sector group when it is better to perform IRC on the at least two evaluation sectors of the sector group, the single antenna part; and combining received signals using IRC for antennas of any antenna part comprising more than one antenna; and without IRC for received signals for antennas of any antenna parts comprising only one antenna. In this way, the antennas are combined in one of three ways only: intra-sector IRC for all antennas of an evaluation sector, inter-sector IRC for all antennas of the evaluation sectors in question, or without IRC. This reduces the number of permutations for IRC greatly while still providing great rejection of interference where applicable. The reduced number of permutations is particularly valuable when the number of antennas of a network node increases, as the number of permutations without this method quickly increases to infeasible numbers.

The step of determining for a sector group and the step of forming a single antenna part may be repeated until an exit condition is true.

The exit condition may be that all possible combinations of the evaluation sectors have been considered as a sector group.

The method may further comprise the step of: when there are sector groups comprising at least one common evaluation sector, combining all antennas of these sector groups by inter-sector IRC.

When antennas of different polarisations are used, antennas of different polarisations may belong to different evaluation sectors, while all antennas of each physical sector of the same polarisation may belong to the same evaluation sector.

When antennas of different polarisations are used, the evaluation sectors may contain the same respective elements as corresponding physical sectors. In other words, the evaluation sectors correspond to the physical sectors.

The step of determining for each evaluation sector may comprise comparing a cost function result of the alternatives; and the step of determining for a sector group may comprise comparing a cost function result of the alternatives.

According to a second aspect, it is presented a network node for determining, in a cellular communication network, how to combine received signals from a plurality of antennas in an antenna set, wherein each antenna belongs to one of a plurality of evaluation sectors. The network node comprises: a processor; and a memory storing instructions that, when executed by the processor, causes the network node to: determine for each evaluation sector whether it is better to perform IRC, interference rejection combining, on received signals for all antennas of the evaluation sector or not; for each evaluation sector, when it is better to perform IRC, form a single antenna part for the evaluation sector comprising all antennas of the evaluation sector, the single antenna part; for each evaluation sector, when it is better not to perform IRC, form a separate antenna part for each antenna of the evaluation sector; determine for a sector group comprising at least two evaluation sectors whether it is better to perform IRC on all antennas of the at least two evaluation sectors or not; form a single combined antenna part for the sector group comprising all antennas of the evaluation sectors of the sector group when it is better to perform IRC on the at least two evaluation sectors of the sector group, the single antenna part; and combine received signals using IRC for antennas of any antenna part comprising more than one antenna; and without IRC for received signals for antennas of any antenna parts comprising only one antenna.

The network node may further comprise instructions that, when executed by the processor, causes the network node to repeat the instructions to determine for a sector group and the instructions to form a single antenna part until an exit condition is true.

The exit condition may be that all possible combinations of the evaluation sectors have been considered as a sector group.

The network node may further comprise instructions that, when executed by the processor, causes the network node to: when there are sector groups comprising at least one common evaluation sector, combine all antennas of these sector groups by inter-sector IRC.

When antennas of different polarisations are used, antennas of different polarisations may belong to different evaluation sectors, while all antennas of each physical sector of the same polarisation may belong to the same evaluation sector.

When antennas of different polarisations are used, the evaluation sectors may contain the same respective elements as corresponding physical sectors.

The instructions to determine for each evaluation sector comprise instructions that, when executed by the processor, causes the network node to compare a cost function result of the alternatives; and wherein the instructions to determine for a sector group comprise instructions that, when executed by the processor, causes the network node to compare a cost function result of the alternatives.

According to a third aspect, it is presented a computer program for determining, in a network node of a cellular communication network, how to combine received signals from a plurality of antennas in an antenna set, wherein each antenna belongs to one of a plurality of evaluation sectors. The computer program comprises computer program code which, when run on the network node causes the network node to: determine for each evaluation sector whether it is better to perform intra-sector IRC, interference rejection combining, on received signals for all antennas of the evaluation sector than refraining from performing IRC on any of the received signals for the antennas of the evaluation sector; for each evaluation sector, when it is better to perform IRC, form a single antenna part for the evaluation sector comprising all antennas of the evaluation sector; for each evaluation sector, when it is better not to refrain from performing IRC on any of the received signals for the antennas, form a separate antenna part for each antenna of the evaluation sector; determine for a sector group comprising at least two evaluation sectors whether it is better to perform inter-sector IRC on all antennas of the at least two evaluation sectors or to keep the previously formed antenna part; and form a single combined antenna part for the sector group comprising all antennas of the evaluation sectors of the sector group when it is better to perform IRC on the at least two evaluation sectors of the sector group, the single antenna part; and combine received signals using IRC for antennas of any antenna part comprising more than one antenna; and without IRC for received signals for antennas of any antenna parts comprising only one antenna.

According to a fourth aspect, it is presented a computer program product comprising a computer program according to the third aspect and a computer readable means on which the computer program is stored.

According to a fifth aspect, it is presented a network node comprising: means for determining for each one of a plurality of evaluation sector, each comprising one or more antennas of an antenna set, whether it is better to perform intra-sector IRC, interference rejection combining, on received signals for all antennas of the evaluation sector than refraining from performing IRC on any of the received signals for the antennas of the evaluation sector; means for, for each evaluation sector, when it is better to perform intra-sector IRC, forming a single antenna part for the evaluation sector comprising all antennas of the evaluation sector; means for, for each evaluation sector, when it is better to refrain from performing IRC on any of the received signals for the antennas, forming a separate antenna part for each antenna of the evaluation sector; means for determining for a sector group comprising at least two evaluation sectors whether it is better to perform inter-sector IRC on all antennas of the at least two evaluation sectors or to keep the previously formed antenna parts; means for forming a single combined antenna part for the sector group comprising all antennas of the evaluation sectors of the sector group when it is better to perform IRC on the at least two evaluation sectors of the sector group, the single antenna part; and means for combining received signals using IRC for antennas of any antenna part comprising more than one antenna; and without IRC for received signals for antennas of any antenna parts comprising only one antenna.

The network node may further comprise means for repeating the determining for a sector group and the forming a single antenna part may be repeated until an exit condition is true.

The exit condition may be that all possible combinations of the evaluation sectors have been considered as a sector group.

The network node may further comprise means for: when there are sector groups comprising at least one common evaluation sector, combining all antennas of these sector groups by inter-sector IRC.

When antennas of different polarisations are used, antennas of different polarisations may belong to different evaluation sectors, while all antennas of each physical sector of the same polarisation may belong to the same evaluation sector.

When antennas of different polarisations are used, the evaluation sectors may contain the same respective elements as corresponding physical sectors. In other words, the evaluation sectors correspond to the physical sectors.

The means for determining for each evaluation sector may comprise means for comparing a cost function result of the alternatives; and the means for determining for a sector group may comprise means for comparing a cost function result of the alternatives.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
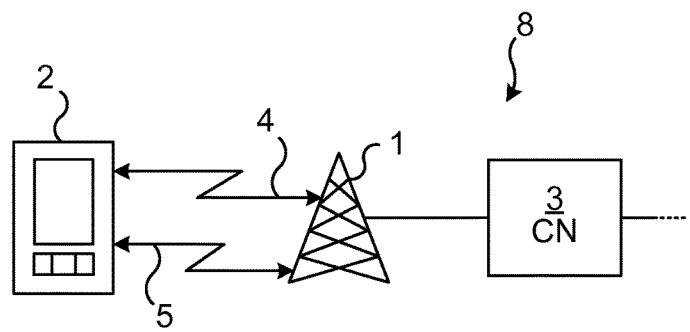
FIG. 1 is a schematic diagram illustrating an environment where embodiments presented herein can be applied.

FIG. 1 is a schematic diagram illustrating an environment where embodiments presented herein can be applied. A mobile communications network 8 comprises a core network 3 and a radio access network comprising one or more radio base stations 1. The radio base stations 1 are here in the form of evolved Node Bs also known as eNBs but could also be in the form of Node Bs (NodeBs/NBs) and/or BTSs (Base Transceiver Stations) and/or BSSs (Base Station Subsystems), etc. The radio base stations 1 provide radio connectivity to a plurality of wireless devices 2. The term wireless device is also known as user equipment (UE), mobile terminal, user terminal, user agent, etc.

Each one of the radio base stations 1 provides radio coverage in one or more respective radio cells. Uplink (UL) communication 4, from the wireless device 2 to the radio base station 1, and downlink (DL) communication 5, from the radio base station 1 to the wireless device 2 occur over a wireless radio interface. The radio conditions of the wireless radio interface vary over time and also depend on the position of the wireless device 2, due to effects such as interference, fading, multipath propagation, etc.

The core network 3 provides access to central functions in the mobile communication network 8 and connectivity to other communication networks.

The mobile communications network 8 may e.g. comply with any one or a combination of LTE (Long Term Evolution), UMTS utilising W-CDMA (Wideband Code Division Multiplex), CDMA2000 (Code Division Multiple Access 2000, GSM (Global System for Mobile Communication) or any other current or future wireless network, as long as the principles described hereinafter are applicable. Nevertheless, LTE will be used below to fully illustrate a context in which embodiments presented herein can be applied.

Figure 2:
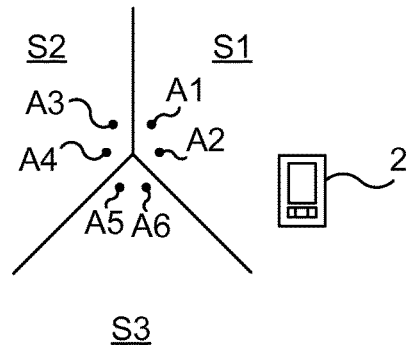
FIG. 2 is a schematic diagram illustrating sectors and antennas for a radio base station of FIG. 1 according to one embodiment.

FIG. 2 is a schematic diagram illustrating sectors and antennas for a radio base station of FIG. 1 according to one embodiment. Each antenna may comprise one or more antenna elements. The antennas can have different polarisation directions. The sectors shown here are evaluation sectors, which denotes a sector for the purpose of evaluating whether to perform IRC or not and what type of IRC. In one embodiment, the evaluation sectors are the same as physical sectors. However, when polarisation is used, the physical sector can be split into two (or more) evaluation sectors, where each evaluation sector comprises the antenna device(s) of the physical sector having the same polarisation. In another embodiment, the evaluation sector equals the physical sector even when polarisation is used such that antennas of both polarisations form part of the same evaluation sector. In the following description polarisation is neglected and the term evaluation sector is used to indicate a possible division of a physical sector into separate evaluation sectors.

In this example, there is a first evaluation sector S1 served by a first antenna A1 and a second antenna A2, a second evaluation sector S2 served by a third antenna A3 and a fourth antenna A4 and a third evaluation sector S3 served by a fifth antenna A5 and a sixth antenna A6.

In this scenario, the wireless device 2 is in the first evaluation sector S1.

While the evaluation sector and antenna usage shown in FIG. 2 will be used to illustrate in the following description, it should be appreciated that the principles presented herein are applicable to any number of physical sectors, any number of evaluation sectors and any number of antennas, as long as there are at least two evaluation sectors and at least two antennas.

Here now follows a more thorough description of how a plurality of antennas can be used in concert for receiving signals. The following description is valid for a frequency non-selective channel. Extensions to a frequency-selective channel can be made by dividing the channel into smaller frequency portions that are non-selective, treating the portions individually.

Column vectors denoted by bold letters will represent the set of values over the A receive antennas. Matrices are represented by uppercase bold letters. The jth element of the ith row of the matrix will be represented by the letter representing the matrix with subindices i and j. For example the jth element of the ith row of the matrix F is denoted $F_{ij}$.

The transmitted signal x from the wireless device results after propagation over the air to A antennas in the received signal y given by $$y = hx + n, \quad (1)$$

where h is the channel and n is the vector of noise plus interference on the antennas. The sum of noise and interference has the covariance matrix $\Sigma = E\{nn^H\}$, where the superscript H denotes Hermitian conjugate and E denotes expectation value.

The combined signal z from A antennas is given by $$z = c^H y, \quad (2)$$

where c is the combining weight vector.

It can be shown that the optimum combiner is the interference rejection combiner given by $$c_{IRC} = \frac{\Sigma^{-1} h}{h^H \Sigma^{-1} h} \quad (3)$$

The model for combining in (1)-(3) is valid both for single-point reception and multi-point reception.

For MRC, the combining weight vector is given by $$c_{MRC} = \frac{D^{-1} h}{h^H D^{-1} h} \quad (4)$$

where D is the diagonal matrix constructed by keeping the diagonal of $\Sigma$ and setting all off-diagonal elements of $\Sigma$ to zero:

$$D_{ij} = \begin{cases} \Sigma_{ij}, & \text{if } i = j \\ 0 & \text{otherwise} \end{cases} \quad (5)$$

The selective diversity combining in U.S. Pat. No. 6,128,355 can be seen as a system model selection, where one model is a diagonal noise plus interference covariance matrix corresponding to MRC, and one model is the full estimated noise plus interference covariance matrix corresponding to IRC.

In practice, both h and $\Sigma$ need to be estimated. The maximum-likelihood estimate of $\Sigma$, Q, is given by $$Q = \frac{1}{N} \sum_{u=0}^{N-1} \hat{n}(u) \hat{n}(u)^H \quad (6)$$

where $$\hat{n}(u) = y(u) - \hat{h}(u) x(u) \quad (7)$$

is the estimated interference in the samples u=0, 1, ..., N−1, and ĥ(u) is the channel estimates for the same samples. The N samples are typically close in time and frequency.

A valid covariance matrix is Hermitian and has real positive values on the diagonal. A covariance matrix R characterising a model, is then obtained from Q such that
$R_{ij} = Q_{ij}$ or $R_{ij} = 0$
Diagonal elements are always non-zero: $R_{ii} = Q_{ii}$
R is Hermitian: $R_{ji} = R_{ij}^*$ To find the best model a suitable cost function can be used, e.g. based on an Akaike information criterion. The model with the lowest cost function is then used for antenna combining.

The number $N_m$ of such models is given by the number of combinations that the matrix elements above the diagonal are 0 or not:

$$N_m = 2^{A(A-1)/2} \quad (8)$$

since the number of elements above the diagonal equals A(A−1)/2 where A is the number of receive antennas. The number of models increases extremely fast with the number of receive antennas; for example $N_m=64$ for A=4 and $N_m=32768$ for A=6.

One way to reduce the number of models is to only consider models where correlated interference between antenna i and antenna j in combination with correlated interference between antenna j and antenna k implies correlated interference between antenna i and antenna k.

These models can be characterised by partitions of the set of all antennas used for combining. A partition of a set X is to be interpreted as a way in which X is divided in one or more non-overlapping and non-empty subsets called parts. A part with more than one antenna implies IRC between the antennas in the part; a partition with only single-antenna parts implies MRC.

For each model, the set of antennas is partitioned so that antennas belonging to different parts are considered to have mutually uncorrelated noise and interference. Then $R_{ij}=0$ if i and j are not in the same part. R is given by $$R_{ij} = \begin{cases} Q_{ij}, & \text{if } i \text{ and } j \text{ are in the same part} \\ 0 & \text{otherwise} \end{cases} \quad (9)$$

where $Q_{ij}$ is the estimated interference covariance between antennas i and j. Note that R as given by (9) is a valid covariance matrix model in that it is Hermitian and has real positive values on the diagonal.

The number of possible antenna partitions is given by the Bell number $B_A$ and still increases rapidly with the number of receive antennas in the set. For instance $B_5=52$ and $B_6=203$. Comparing such a large number of models becomes very complex.

According to embodiments presented herein the number of models can be further reduced by the following restriction to the partitions:

The set of all antennas is partitioned so that for any part with more than one antenna, either none or all antennas of one evaluation sector are in the part. The reason for this simplification is that antennas within an evaluation sector typically have similar interference properties because they cover the same geographical area, optionally also the same polarisation.

If the receive antennas are cross-polarised, interference properties may differ between antennas in the same physical sector but with different polarisation. In this case, the physical sector can be split into two evaluation sectors, where each evaluation sector comprises the antenna devices of the physical sector having the same polarisation. In another embodiment, the evaluation sector equals the physical sector such that antennas of both polarisations form part of the same evaluation sector. In the following description polarisation is neglected. The term evaluation sector is used herein to denote a sector for the purpose of evaluating whether to perform IRC or not and what type of IRC.

Using the principles presented herein, for combination over three evaluation sectors with two antennas in each evaluation sector, the number of models is then reduced from $B_6$=203 to 15:

Eight models without any inter-sector IRC:
A1/A2/A3/A4/A5/A6, A1A2/A3/A4/A5/A6, A1/A2/A3A4/A5/A6, A1A2/A3A4/A5/A6, A1/A2/A3/A4/A5A6, A1A2/A3/A4/A5A6, A1/A2/A3A4/A5A6, A1A2/A3A4/A5A6

Six models with inter-sector IRC between two evaluation sectors,
A1A2A3A4/A5/A6, A1A2A3A4/A5A6, A1A2A5A6/A3/A4, A1A2A5A6/A3A4, A1/A2/A3A4A5A6, A1A2/A3A4A5A6 and the last model being inter-sector IRC between all evaluation sectors: A1A2A3A4A5A6 where the following notation is used: the capital A followed by a number denote antenna with the numbered index and the '/' character is a part delimiters.

Figure 3:
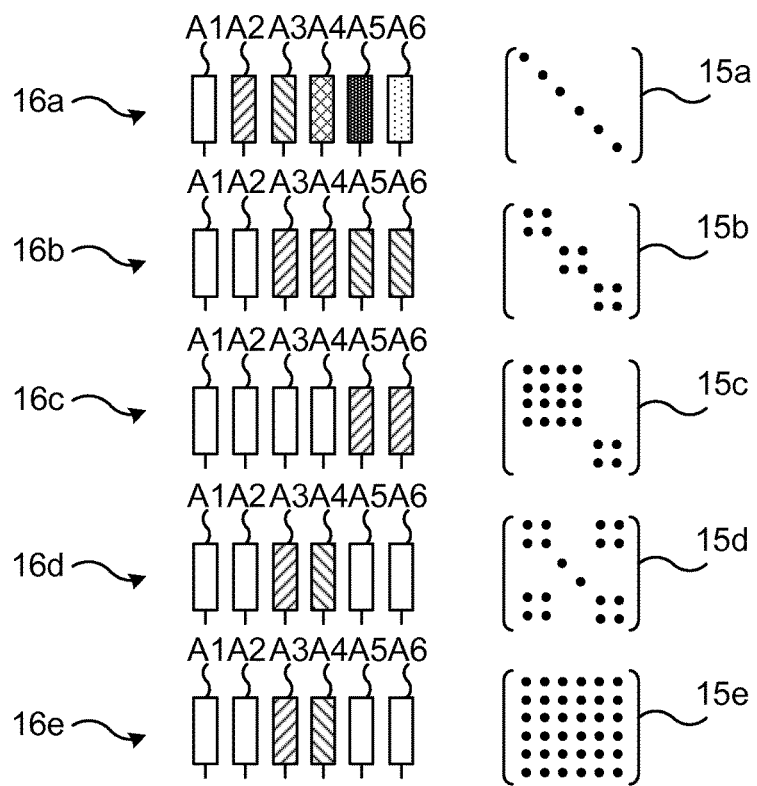
FIG. 3 is a schematic diagram illustrating an example of combination of antennas and corresponding covariance matrices.

FIG. 3 is a schematic diagram illustrating an example of combination of antennas and corresponding covariance matrices. Partitions are shown as set of antennas where all the antennas in one part have the same pattern. The antenna references correspond to those of FIG. 2. The structure of the corresponding interference covariance matrix is also shown where dots mark non-zero matrix elements of R.

Looking from top to bottom, the first combination is A1/A2/A3/A4/A5/A6, where there is no IRC at all and only MRC is utilised. A corresponding schematic first interference covariance matrix 15a is also shown, indicating the individuality of each antenna.

The second combination is A1A2/A3A4/A5A6, where there is intra-sector IRC for each one of the three evaluation sectors S1-S3. A corresponding schematic second interference covariance matrix 15b is also shown, indicating the co-operation of the pairs of antennas.

The third combination is A1A2A3A4/A5A6, where there is intra-sector IRC in the third evaluation sector and inter-sector IRC between the antennas of the first evaluation sector S1 and the second evaluation sector S2. A corresponding schematic third interference covariance matrix 15c is also shown, indicating the co-operation of all four first antennas, and separate co-operation of the pair of the last two antennas.

The fourth combination is A1A2A5A6/A3/A4, where there is inter-sector IRC between the antennas of the first evaluation sector S1 and the third evaluation sector S3, while the antennas of the second evaluation sector utilise MRC. A corresponding schematic fourth interference covariance matrix 15d is also shown, indicating the co-operation of all four first antennas, with individual consideration of the last two antennas.

The fifth combination is A1A2A3A4A5A6, where there is inter-sector IRC for all antennas of all three evaluation sectors S1-S3. A corresponding schematic fifth interference covariance matrix 15e is also shown, indicating the co-operation of all of the six antennas.

It is to be noted that the different combinations shown in FIG. 3 are only illustrative examples and other combinations are equally possible.

Figure 4A:
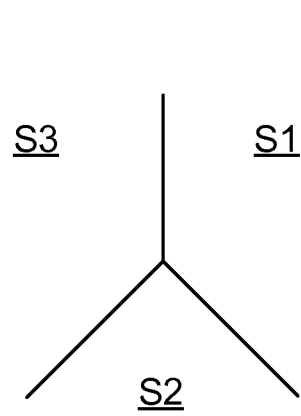
FIGS. 4A-C are schematic diagrams illustrating three example scenarios of interference.
Figure 4B:
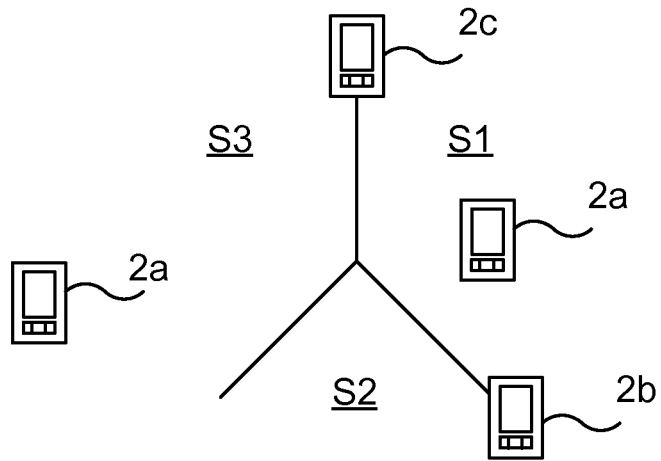
Figure 4C:
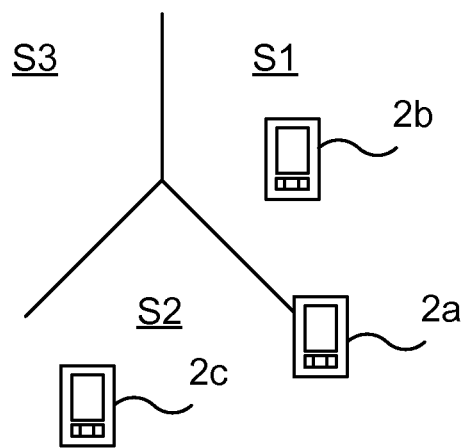

FIGS. 4A-C are schematic diagrams illustrating three example scenarios of interference. In FIG. 4A, there is only one wireless device, here denoted the target wireless device.

In FIG. 4B, there is the target wireless device 2a in the first evaluation sector S1, a second wireless device 2b and a third wireless device. The second wireless device 2b is an interferer located on the edge between the first evaluation sector S1 and the second evaluation sector S2. The third wireless device 2c is an interferer located on the edge between the first evaluation sector S1 and the third evaluation sector S3.

In FIG. 4C, there is the target wireless device 2a, now on the edge between the first evaluation sector S1 and the second evaluation sector S2, a second wireless device 2b and a third wireless device. The second wireless device 2b is an interferer in the first evaluation sector S1. The third wireless device 2C is an interferer in the second evaluation sector S2.

Figure 5A:
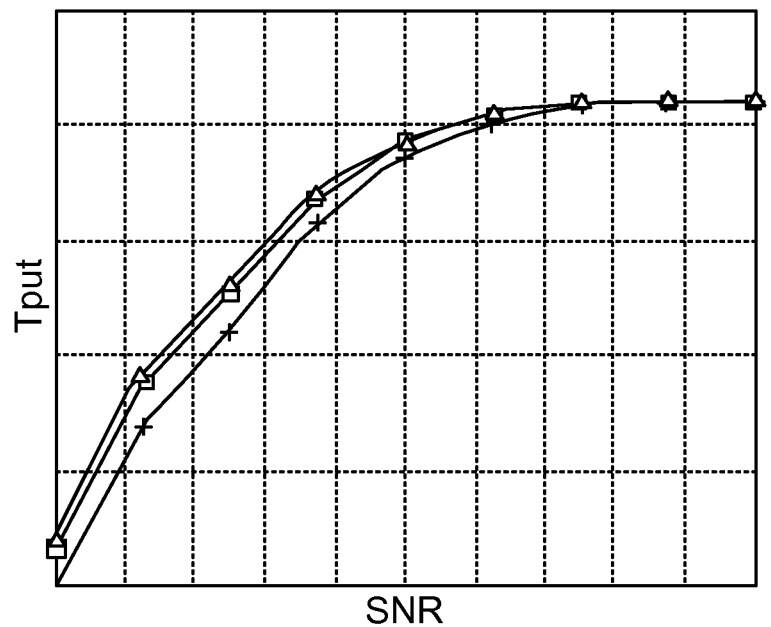
FIGS. 5A-C are schematic graphs illustrating throughput as a function of signal to noise radio (SNR) for various strategies, respectively corresponding to the example scenarios of FIGS. 4A-C.
Figure 5B:
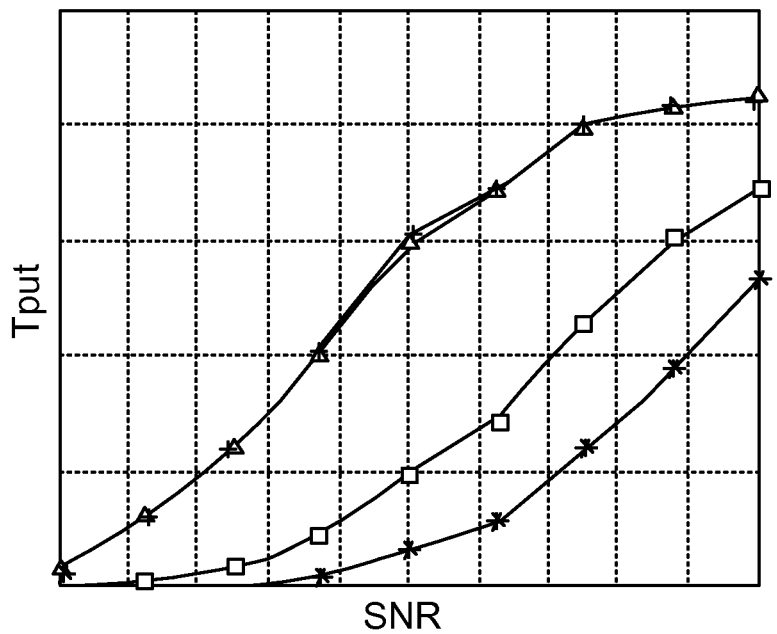
Figure 5C:
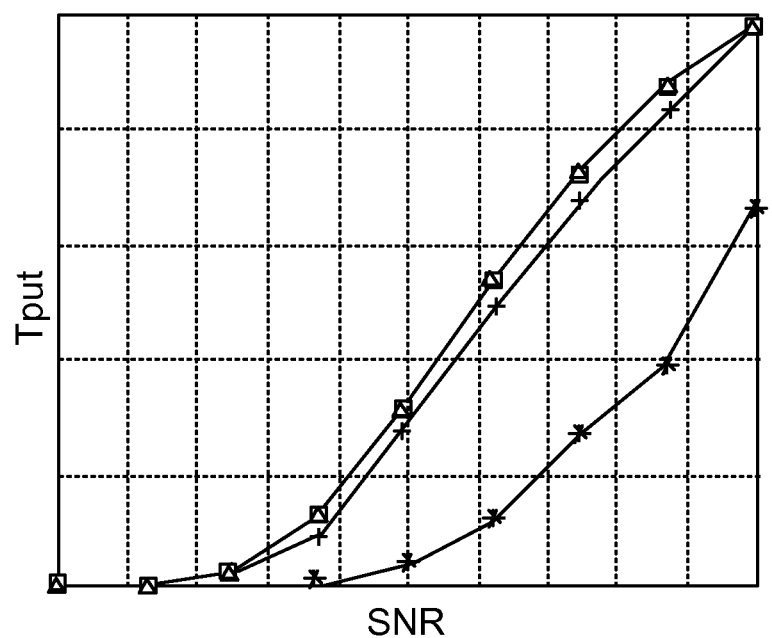

FIGS. 5A-C are schematic graphs illustrating throughput (Tput) as a function of signal-to-noise radio (SNR) for various strategies, respectively corresponding to the example scenarios of FIGS. 4A-C. The graphs reflect simulations which have been performed to evaluate the effectiveness of the embodiments presented herein. In the graphs, the line with square markings represent intra-sector IRC, the line with asterisk markings represent MRC, the line with cross-line markings represents inter-sector IRC and the line with triangle markings represents an example embodiment of what is presented herein.

The graph of FIG. 5A corresponds to FIG. 4A, i.e. no interferers. The embodiment provides essentially the same good performance as MRC.

The graph of FIG. 5B corresponds to FIG. 4B, i.e. two sector edge interferers. The embodiment provides essentially the same good performance as inter-sector IRC.

The graph of FIG. 5C corresponds to FIG. 4C, i.e. two mid sector interferers. The embodiment provides almost the same good performance as intra-sector IRC.

Figure 6A:
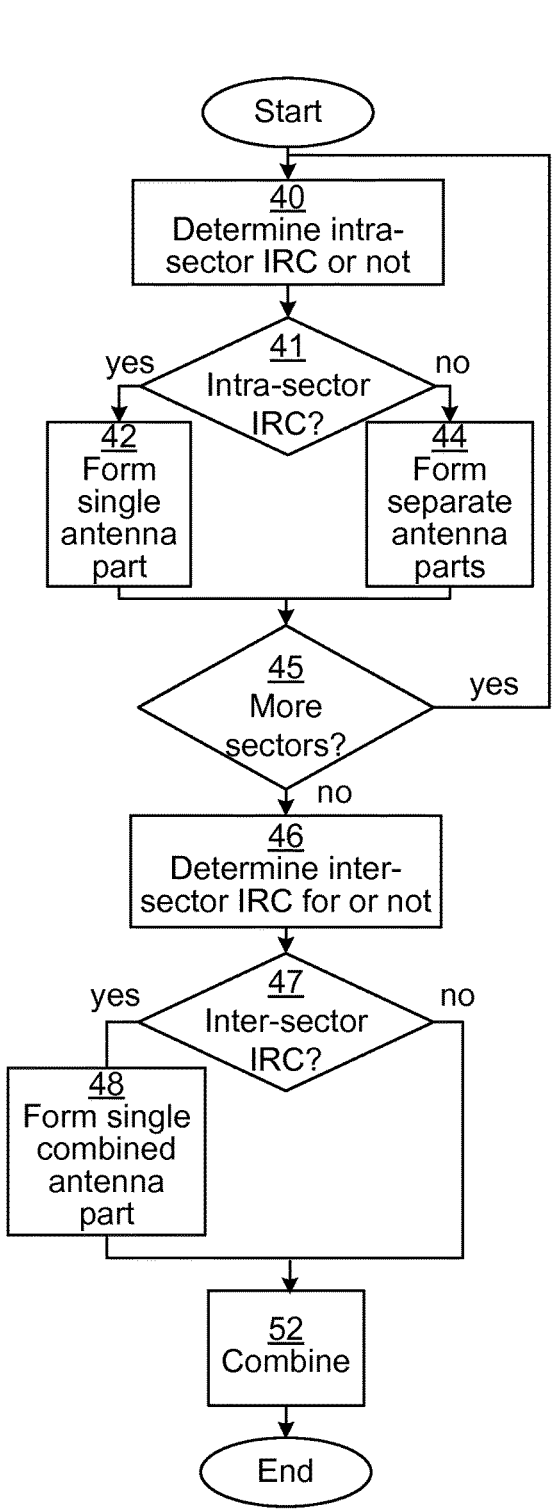
FIGS. 6A-B are flow charts illustrating methods performed in a network node of FIG. 1 for determining how to combine received signals from a plurality of antennas.
Figure 6B:
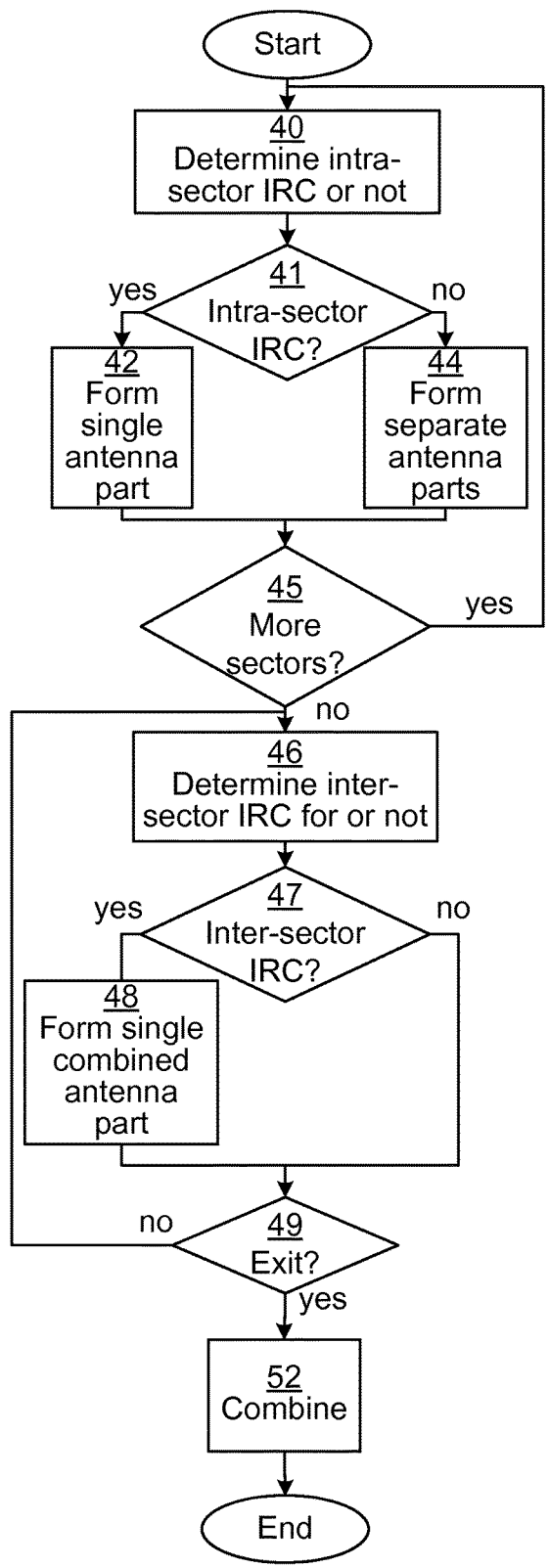

FIGS. 6A-B are flow charts illustrating methods performed in a network node of FIG. 1 such as a radio base station 1. The method illustrated in FIG. 6A will be described first. In one embodiment, the method is performed in a distributed manner, with different steps being performed by different nodes in a mobile communication network.

In a determine intra-sector IRC or not step 40, the network node determines whether it is better to perform IRC on received signals for all antennas of a particular evaluation sector than refraining from performing IRC on any of the received signals for the antennas of the evaluation sector. In other words, it is an all or nothing approach where the two extremes of intra-sector IRC on all antennas or no intra-sector IRC at all. As shown above, this greatly reduces the number of possible permutations of IRC with minimal impact on performance.

In one embodiment, when antennas of different polarisations are used, antennas of different polarisations belong to different evaluation sectors. Still, all antennas of each physical sector of the same polarisation belong to the same evaluation sector. This is useful in a situation where interference differs significantly between polarisations.

In one embodiment, when antennas of different polarisations are used, the evaluation sectors contain the same respective elements as corresponding physical sectors. In other words, the evaluation sectors are equal to the physical sectors. This is useful when interference is similar across polarisations, since such a definition of antenna reduces the number of antennas and thus the processing required.

In one embodiment, the determination as to which alternative (IRC or not) is better, comprises comparing a cost function result of the alternatives. The cost function can e.g. be based on an Akaike information criterion as described in more detail below.

In a conditional intra-sector IRC step 41, the method proceeds to a form single antenna part step 42 when it is better to perform intra-sector IRC on received signals for all antennas of the evaluation sector than refraining from performing IRC on any of the received signals for the antennas of the evaluation sector. Otherwise, the method proceeds to a form separate antenna parts step 44.

In the form single antenna part step 42, a single antenna part is formed for the evaluation sector comprising all antennas of the evaluation sector.

In the form separate antenna parts step 44, a separate antenna part is formed for each antenna of the evaluation sector. The separate antenna part can be used for MRC but could also later be absorbed in a larger antenna part used for inter-sector IRC.

In a conditional more sectors step 45, it is determined whether there are any more evaluation sectors which have not been evaluated. If this is the case, the method returns to the determine intra-sector IRC or not step 40 for the hitherto unevaluated evaluation sector. Otherwise, all evaluation sectors have been evaluated and the method continues to a determine inter-sector IRC or not step 46.

In the determine inter-sector IRC or not step 46, it is determined for a sector group comprising at least two evaluation sectors whether it is better to keep the antenna parts of the at least two evaluation sectors or to combine all antennas of the at least two evaluation sectors by inter-sector interference rejection.

In one embodiment, the determination as to which alternative (IRC or not) is better, comprises comparing a cost function result of the alternatives. The cost function can e.g. be based on an Akaike information criterion as described in more detail below.

In a conditional inter-sector IRC step 47, the method proceeds to a form single combined antenna part step 48 when it is better to perform inter-sector IRC for all of the antennas of the at least two evaluation sectors. Otherwise, the method proceeds to a combine step 52.

In the form single combined antenna part step 48, a single combined antenna part is formed for the sector group comprising all antennas of the evaluation sectors of the sector group.

In a combine step 52, received signals from all of the antennas are combined. For antennas of any antenna part comprising more than one antenna IRC is used. For received signals for antennas of any antenna parts comprising only one antenna, IRC is not used. Instead, a combining using, e.g. MRC can be used for these antennas.

This can e.g. be manifested in a covariance matrix as illustrated in FIG. 3 and described above.

FIG. 6B is a flow chart illustrating a method similar to the method illustrated in FIG. 6A. Only new steps or steps which are modified compared to the method illustrated in FIG. 6A will be described below.

In an optional conditional exit step 49, it is determined whether an exit condition is true. If this is the case, the method proceeds to the combine step 52. Otherwise, the method returns to the determine inter-sector IRC or not step 46.

The exit condition can e.g. be that all possible combinations of the evaluation sectors have been considered as a sector group.

An example of an embodiment of the methods above for three evaluation sectors and two antennas in each evaluation sector will now be explained for illustration purposes.
1. IRC is selected for the first evaluation sector S1 and the second evaluation sector S2, MRC is selected for the third evaluation sector S3: the initial antenna partition is then A1A2/A3A4/A5/A6. This step corresponds to steps 40-44 above.
2. Consider all possible sector partitions, corresponding to steps 46-49 above:
   a. Sector partition S1/S2/S3 keeps the antenna partition from step 1 since there is only one evaluation sector in each sector part: A1A2/A3A4/A5/A6
   b. Sector partition S1S2/S3 keeps the antenna parts A5 and A6 in the third evaluation sector S3 and combines all other antenna parts: the antenna partition is obtained as A1A2A3A4/A5/A6
   c. Sector partition S1/S2S3 gives the antenna partition A1A2/A3A4A5A6
   d. Sector partition S1S3/S2 gives the antenna partition A1A2A5A6/A3A4
   e. Sector partition S1S2S3 merges all antenna parts and gives the antenna partition A1A2A3A4A5A6
3. The best antenna partition from step 2 can then be selected.

In one embodiment only a subset of all sector partitions are considered in order to reduce the computational complexity. This may be important if there are more than three evaluation sectors.

In one embodiment the model selection method uses the quasi Akaike information criterion:

$$q_{AIC} = 2k - \frac{2}{p}\ln L, \qquad (10)$$

where k is the number of estimated parameters of the model, L is the maximum likelihood for the model, and p is a design parameter. The model with the smallest value of $q_{AIC}$ should be selected. For the covariance matrix model, k equals the number of possibly non-zero matrix elements. The likelihood for estimated interference samples with interference covariance matrix R is given by the zero-mean circular symmetric complex normal distribution CN(0,R):

$$\frac{1}{(\pi)^{AN}|R|^N}\exp\left(-\sum_{u=0}^{N-1}\hat{n}(u)^H R^{-1}\hat{n}(u)\right), \qquad (11)$$

where |·| denotes determinant.

It can be shown that the maximum likelihood L for the model with interference covariance matrix R is $$L=(\pi)^{-AN}|R|^{-N}e^{-AN}. \qquad (12)$$

Since the number of antennas A and the number of samples N are the same for all models to be compared, it will turn out in the following that a convenient choice of cost function is $$C=(\pi e)^{-A}e^{(pq_{AIC}/2-pA)/N}, \qquad (13)$$

which is an increasing function of $q_{AIC}$. Then from (10), (12), and (13) the cost function is given by $$C = |R|e^{\frac{p}{N}(k-A)}. \qquad (14)$$

The selected model is the one that minimises C.

An embodiment will be described with the example for a site with three evaluation sectors and two antennas in each evaluation sector.

Calculations of the cost function (14) can be simplified by factorising the cost function over the antenna parts as follows:

For all models with more than one antenna part in the partition the matrix R is block-diagonal or can be cast into block-diagonal form by a permutation of columns and rows, where each block corresponds to one part. Hence, for the models with more than one antenna part, |R| is the product of the determinants of the blocks of Q corresponding to the different antenna parts. Denote by $Q^Y$ the square matrix made up of the rows and columns of Q indicated in the set Y.

Assume that the partition has $N_P$ antenna parts, $U_i$, i=1, 2, ..., $N_P$, with $n_i$ elements in antenna part i. Then the factor $e^{p(k-A)/N}$ in (14) can be written as a product over the different antenna parts:

$$e^{p(k-A)/N} = e^{\frac{p}{N}\Sigma_i k_i} = \prod_{i=1}^{N_P} e^{\frac{p}{N}k_i}, \quad (15)$$

where $k_i$ is the number of off-diagonal elements in block i, i.e. $k_i = n_i(n_i-1)$, and we have used the fact that $\Sigma_{i=1}^{N_P} n_i = A$.

It follows that the cost function, being the product of $e^{p(k-A)/N}$ and |R|, also can be factorized over the antenna parts:

$$C = (\pi e)^{-A} e^{(pqAIC/2 - pA)/N} = |R|e^{p(k-A)/N} = \prod_{i=1}^{N_P} |Q^{U_i}| e^{\frac{p}{N}k_i}. \quad (16)$$

First the cost function for intra-sector MRC and intra-sector IRC is evaluated in each evaluation sector and the model with lowest cost function is selected for each evaluation sector in a first round. This corresponds to step 1 above.

Then the cost function for inter-sector IRC between pairs of evaluation sectors is evaluated and compared to the cost function for selected intra-sector MRC/IRC for the evaluation sectors in each pair. The set of all antennas in the two evaluation sectors is a candidate evaluation sector-pair if the former cost function is less than the latter.

At most one candidate evaluation sector-pair, the one with minimum cost function, is kept and compared to the cost function corresponding to inter-sector IRC over all antennas.

The input to the algorithms is the interference covariance matrix Q, the sets of antennas in the evaluation sectors $S_i$, and the sets of antennas in the evaluation sector-pairs $P_l$.

The algorithm is described in detail in the following.
1) Calculate for each evaluation sector i the minimum value $B_i$ of the part of the cost function that depends only on the antenna signals within the evaluation sector:

$$B_i = \min\left(\prod_{j \in S_i} Q_{jj}, |Q^{S_i}|T_{S_i}\right),$$

where $S_i$ is the set of all antennas in evaluation sector i, $T_{S_i} = e^{pn_i(n_i-1)/N}$, and $n_i$ is the number of antennas in evaluation sector i. If $$\prod_{j \in S_i} Q_{jj} > |Q^{S_i}|T_{S_i}$$

let all antennas in evaluation sector i be one part, otherwise there is exactly one antenna in each part in the evaluation sector.

2) Calculate the cost functions $$C_S = \prod_{\forall S_i} B_i, \quad C_E = |Q|T_E, \text{ where } T_E = e^{pA(A-1)/N},$$

and $C_{P_l} = \min\left(\prod_{S_i \subset P_l} B_i, |Q^{P_l}|T_{P_l}\right) \cdot \prod_{S_i \not\subset P_l} B_i, l = 1, 2, \ldots, L.$ 3) Find the minimum of the cost functions $C_S$, $C_E$, and $C_{P_l}$, l=1, 2, ..., L.
4) If the minimum cost function is $C_E$, then the partition consists of one part, R=Q, and the algorithm is finished.
5) If the minimum cost function is $C_{P_m}$ then $P_m$ is one part. For all antennas not in $P_m$ keep the parts obtained in 1).
6) If the minimum cost function is $C_S$ then keep the parts in 1).
7) Select the covariance matrix R corresponding to the partition.

Figure 7:
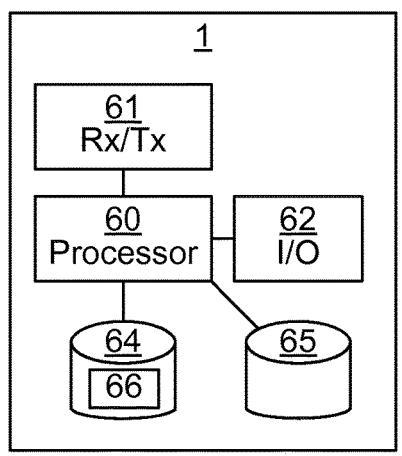
FIG. 7 is a schematic diagram showing some components of an embodiment of the radio base station of FIG. 1.

FIG. 7 is a schematic diagram showing some components of the radio base station 1 of FIG. 1. The radio base station 1 is one example of a network node. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product. The processor 60 can be configured to execute the methods described with reference to FIGS. 6A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 65 can be any combination of read and write memory (RAM) and read only memory (ROM). The data memory 65 may also comprise persistent storage, which, for example, can be any single one or combination of magnetic memory, optical memory, solid state memory or even remotely mounted memory.

The radio base station 1 further comprises an I/O interface 62 for communicating with a core network and optionally with other radio base stations.

The radio base station 1 also comprises one or more transceivers 61, comprising analogue and digital components for radio communication with wireless devices within one or more radio cells, e.g. using remote radio head devices as described above. The processor 60 controls the general operation of the radio base station 1, e.g. by sending control signals to the transceiver 61 and receiving reports from the transceiver 61 of its operation.

Antennas may also be provided as part of the radio base station 1 or in a remote radio head connected to the transceiver(s) 61.

Other components of the radio base station 1 are omitted in order not to obscure the concepts presented herein.

Figure 8:
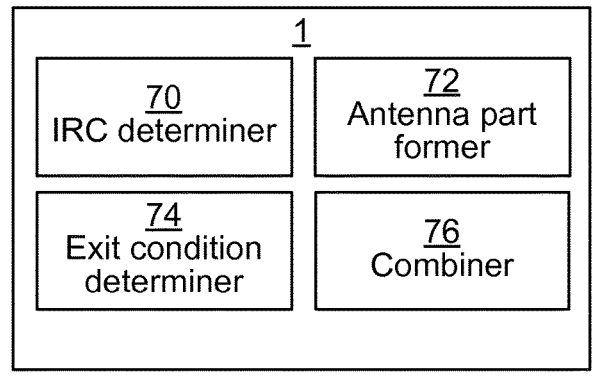
FIG. 8 is a schematic diagram showing functional modules of an embodiment of the radio base station of FIG. 1.

FIG. 8 is a schematic diagram showing functional modules of an embodiment of the radio base station of FIG. 1. The modules can be implemented using software instructions such as a computer program executing in the radio base station 1 and/or using hardware, such as application specific integrated circuits, field programmable gate arrays, discrete logical components, etc. The modules correspond to the steps in the methods illustrated in FIGS. 6A-B.

An IRC determiner 70 is arranged to determine when it is better to perform IRC and when this is not better as explained in more detail above. This module corresponds to the determine intra-sector IRC or not step 40 and the determine inter-sector IRC or not step 46 of FIGS. 6A-B.

An antenna part former 72 is arranged to form antenna parts either as a combination of antennas or as separate antenna parts for separate antennas. This module corresponds to the form single antenna part step 42, the form separate antenna parts step 44 and the form single combined antenna part step 48 of FIGS. 6A-B.

An exit condition determiner 74 is arranged to determine whether an exit condition is true. This module corresponds to the conditional exit step 49 of FIG. 6B.

A combiner 76 is arranged to perform combining of antenna signals, e.g. using IRC and/or MRC. This module corresponds to the combine step 52 of FIGS. 6A-B.

Figure 9:
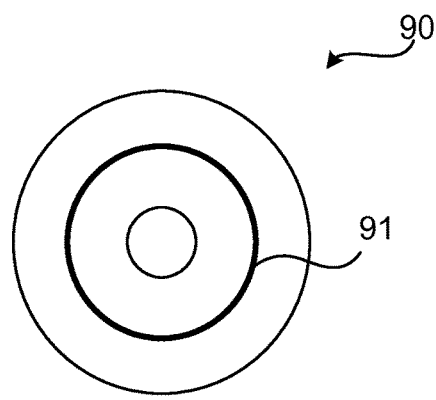
FIG. 9 shows one example of a computer program product comprising computer readable means.

FIG. 9 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 66 of FIG. 7. While the computer program 91 is here schematically shown as a track on the depicted optical disk, the computer program can be stored in any way which is suitable for the computer program product.

The invention has mainly been described above with reference to a few embodiments. However, as is readily appreciated by a person skilled in the are, other embodiments than the ones disclosed above are equally possible within the scope of the invention, as defined by the appended patent claims.

The invention claimed is:

1. A method for determining how to combine received signals from a plurality of antennas in an antenna set, wherein each antenna belongs to one of a plurality of evaluation sectors, the method being performed in a network node of a cellular communication network and comprising the steps of:
    determining for each evaluation sector whether it is better to perform intra-sector IRC, interference rejection combining, on received signals for all antennas of the evaluation sector than refraining from performing IRC on any of the received signals for the antennas of the evaluation sector;
    for each evaluation sector, when it is better to perform intra-sector IRC, forming a single antenna part for the evaluation sector comprising all antennas of the evaluation sector;
    for each evaluation sector, when it is better to refrain from performing IRC on any of the received signals for the antennas, forming a separate antenna part for each antenna of the evaluation sector;
    determining for a sector group comprising at least two evaluation sectors whether it is better to perform inter-sector IRC on all antennas of the at least two evaluation sectors or to keep the previously formed antenna parts;
    forming a single combined antenna part for the sector group comprising all antennas of the evaluation sectors of the sector group when it is better to perform IRC on the at least two evaluation sectors of the sector group, the single antenna part; and
    combining received signals using IRC for antennas of any antenna part comprising more than one antenna; and without IRC for received signals for antennas of any antenna parts comprising only one antenna.

2. The method according to claim 1, wherein the step of determining for a sector group and the step of forming a single antenna part are repeated until an exit condition is true.

3. The method according to claim 2, wherein the exit condition is that all possible combinations of the evaluation sectors have been considered as a sector group.

4. The method according to claim 2, further comprising the step of:
    when there are sector groups comprising at least one common evaluation sector, combining all antennas of these sector groups by inter-sector IRC.

5. The method according to claim 1, wherein when antennas of different polarisations are used, antennas of different polarisations belong to different evaluation sectors, while all antennas of each physical sector of the same polarisation belong to the same evaluation sector.

6. The method according to claim 1, wherein when antennas of different polarisations are used, the evaluation sectors contain the same respective elements as corresponding physical sectors.

7. The method according to claim 1, wherein the step of determining for each evaluation sector comprises comparing a cost function result of the alternatives; and wherein the step of determining for a sector group comprises comparing a cost function result of the alternatives.

8. A network node for determining, in a cellular communication network, how to combine received signals from a plurality of antennas in an antenna set, wherein each antenna belongs to one of a plurality of evaluation sectors, the network node comprising:
    a processor; and
    a memory storing instructions that, when executed by the processor, causes the network node to:
    determine for each evaluation sector whether it is better to perform IRC, interference rejection combining, on received signals for all antennas of the evaluation sector or not;
    for each evaluation sector, when it is better to perform IRC, form a single antenna part for the evaluation sector comprising all antennas of the evaluation sector, the single antenna part;
    for each evaluation sector, when it is better not to perform IRC, form a separate antenna part for each antenna of the evaluation sector;
    determine for a sector group comprising at least two evaluation sectors whether it is better to perform IRC on all antennas of the at least two evaluation sectors or not;
    form a single combined antenna part for the sector group comprising all antennas of the evaluation sectors of the sector group when it is better to perform IRC on the at least two evaluation sectors of the sector group, the single antenna part; and
    combine received signals using IRC for antennas of any antenna part comprising more than one antenna; and without IRC for received signals for antennas of any antenna parts comprising only one antenna.

9. The network node according to claim 8, further comprising instructions that, when executed by the processor, causes the network node to repeat the instructions to determine for a sector group and the instructions to form a single antenna part until an exit condition is true.

10. The network node according to claim 9, wherein the exit condition is that all possible combinations of the evaluation sectors have been considered as a sector group.

11. The network node according to claim 9, further comprising instructions that, when executed by the processor, causes the network node to: when there are sector groups comprising at least one common evaluation sector, combine all antennas of these sector groups by inter-sector IRC.

12. The network node according to claim 8, wherein when antennas of different polarisations are used, antennas of different polarisations belong to different evaluation sectors, while all antennas of each physical sector of the same polarisation belong to the same evaluation sector.

13. The network node according to claim 8, wherein when antennas of different polarisations are used, the evaluation sectors contain the same respective elements as corresponding physical sectors.

14. The network node according to claim 8, wherein the instructions to determine for each evaluation sector comprise instructions that, when executed by the processor, causes the network node to compare a cost function result of the alternatives; and wherein the instructions to determine for a sector group comprise instructions that, when executed by the processor, causes the network node to compare a cost function result of the alternatives.

15. A non-transitory computer-readable recording medium storing executable codes, which when executed by a network node of a cellular communication network, make the network node to perform a method for determining how to combine signals received from a plurality of antennas in an antenna set, wherein each antenna belongs to one of a plurality of evaluation sectors, the method comprising:
  determining for each evaluation sector whether it is better to perform intra-sector IRC, interference rejection combining, on received signals for all antennas of the evaluation sector than refraining from performing IRC on any of the received signals for the antennas of the evaluation sector;
  for each evaluation sector, when it is better to perform IRC, forming a single antenna part for the evaluation sector comprising all antennas of the evaluation sector;
  for each evaluation sector, when it is better not to refrain from performing IRC on any of the received signals for the antennas, forming a separate antenna part for each antenna of the evaluation sector;
  determining for a sector group comprising at least two evaluation sectors whether it is better to perform inter-sector IRC on all antennas of the at least two evaluation sectors or to keep the previously formed antenna part;
  forming a single combined antenna part for the sector group comprising all antennas of the evaluation sectors of the sector group when it is better to perform IRC on the at least two evaluation sectors of the sector group, the single antenna part; and
  combining received signals using IRC for antennas of any antenna part comprising more than one antenna, and without IRC for received signals for antennas of any antenna parts comprising only one antenna.

* * * * *